United States Patent
Shi et al.

(10) Patent No.: US 10,181,917 B2
(45) Date of Patent: Jan. 15, 2019

(54) METHOD AND APPARATUS FOR DETERMINING THRESHOLD FOR INTERFERENCE COORDINATION

(71) Applicant: Telefonaktiebolaget LM Ericsson (publ), Stockholm (SE)

(72) Inventors: Cong Shi, Beijing (CN); Gen Li, Beijing (CN); Tim Irnich, Neuss (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/501,297

(22) PCT Filed: Aug. 5, 2014

(86) PCT No.: PCT/CN2014/083695
§ 371 (c)(1),
(2) Date: Feb. 2, 2017

(87) PCT Pub. No.: WO2016/019507
PCT Pub. Date: Feb. 11, 2016

(65) Prior Publication Data
US 2017/0222741 A1    Aug. 3, 2017

(51) Int. Cl.
*H04B 17/345* (2015.01)
*H04B 17/382* (2015.01)
(Continued)

(52) U.S. Cl.
CPC ......... *H04B 17/345* (2015.01); *H04B 17/336* (2015.01); *H04B 17/382* (2015.01); *H04W 16/10* (2013.01); *H04W 24/08* (2013.01)

(58) Field of Classification Search
CPC .. H04B 17/336; H04B 17/345; H04B 17/382; H04W 24/08
(Continued)

(56) References Cited

U.S. PATENT DOCUMENTS

| 8,478,342 B2 | 7/2013 | Vedantham et al. |
| 2010/0315939 A1* | 12/2010 | Verbin .................. H04B 3/542 |
| | | 370/201 |

(Continued)

FOREIGN PATENT DOCUMENTS

| CN | 102958170 A | 3/2013 |
| CN | 103634919 | 3/2014 |

(Continued)

OTHER PUBLICATIONS

Extended European Search Report for Application No./Patent No. 14899529.3-1875 3178275 PCT/CN2014083695—dated Dec. 18, 2017.

(Continued)

*Primary Examiner* — Lee Nguyen
(74) *Attorney, Agent, or Firm* — Patent Portfolio Builders, PLLC

(57) ABSTRACT

The present invention generally relates to wireless communication, more particularly, but not exclusively, to threshold determination for inter-network interference coordination and for inter-access node (AN) interference coordination. According to one aspect of the present invention there is provided a method for determining a threshold for inter-network interference coordination, on the basis of which it is determined whether radio resource shall be coordinated between a first wireless network and a second wireless network, the method comprising the steps of: receiving interference levels for a plurality of wireless links associated with one or more wireless communication devices within the first wireless network, said interference levels being attributed to the second wireless network; and obtaining the threshold based on the interference levels.

18 Claims, 12 Drawing Sheets

(51) Int. Cl.
   *H04B 17/336*   (2015.01)
   *H04W 24/08*   (2009.01)
   *H04W 16/10*   (2009.01)
   *H04B 17/354*  (2015.01)
(58) Field of Classification Search
   USPC .......................................................... 455/63.1
   See application file for complete search history.

(56) References Cited

U.S. PATENT DOCUMENTS

| | | |
|---|---|---|
| 2011/0117967 A1 | 5/2011 | Vedantham et al. |
| 2014/0098746 A1 | 4/2014 | Luo et al. |
| 2015/0078353 A1* | 3/2015 | Zhang ............... H04W 28/0236 |
| | | 370/336 |

FOREIGN PATENT DOCUMENTS

| | | |
|---|---|---|
| EP | 2 501 189 | 9/2012 |
| WO | WO 2012 168800 | 12/2012 |
| WO | WO 2015 109439 | 7/2015 |
| WO | WO 2015 109441 | 7/2015 |

OTHER PUBLICATIONS

PCT Notification of Transmittal of the International Search Report and the Written Opinion of the International Searching Authority, or the Declaration for International application No. PCT/CN2014/083695 —dated May 6, 2015.

\* cited by examiner

Pattern 1

Pattern 2

Pattern 3

▨ Occupied by the first wireless link
▧ Occupied by the second wireless link

METHOD AND APPARATUS FOR DETERMINING THRESHOLD FOR INTERFERENCE COORDINATION

PRIORITY

This nonprovisional application is a U.S. National Stage Filing under 35 U.S.C. § 371 of International Patent Application Ser. No. PCT/CN2014/083695 filed Aug. 5, 2014, and entitled "Method And Apparatus For Determining Threshold For Interference Coordination."

TECHNICAL FIELD

The present invention generally relates to wireless communication, more particularly, but not exclusively to, threshold determination for inter-network interference coordination and for inter-access node (AN) interference coordination.

BACKGROUND

The mobile broadband era has arrived as the global deployment status of beyond 3G and 4G radio technologies suggests. Network densification along with universal resources reuse is expected to play a key role as an enabler for delivering most of the anticipated network capacity improvements. On the one hand, neither the expected additional spectrum allocation nor the forthcoming novel air-interface processing techniques will be sufficient for sustaining the anticipated exponentially-increasing mobile data traffic. On the other hand, enhanced ultra-dense infrastructure deployments are expected to provide remarkable capacity gains, regardless of the evolutionary or revolutionary approach followed towards 5G development. Recently, this ultra-dense network deployment (UDN) trend is gaining ground as it promises significant capacity improvements.

Ultra-dense networks (UDN) are wireless networks envisioned to provide ubiquitous mobile broadband with access-node densities considerably higher than the densest cellular networks of today, i.e. the distances between Access Node (AN) are from a few meters in indoor deployments up to around 50 m in outdoor deployment. A typical deployment for an UDN is in highly populated areas such as hot spots, office building, or downtown area at cities, where there are demands of high data rate service. The UDN may be designed to utilize an ultra frequency bands at 60 GHz with a wide bandwidth instead of low frequency bands with a clear bandwidth limit, in order to reach an even higher data rate. Therefore, a UDN is also referred as to a "Millimeter Wave (mmW) network.

Although network densification and universal resources reuse is a typical capacity increase strategy in the cellular paradigm, new challenges and issues arise. For example, heavy irregular infrastructure deployment of low-powered ANs leads to random topology networks, for which interference conditions characterization becomes harsh.

FIG. 1 schematically illustrates a scenario for inter-UDN interference. As shown in FIG. 1, two UDNs 110 and 120 are deployed in an office section and have coverage's overlapping with each other. The first UDN 110 comprises an AN 111 and an aggregation node (AGN) 112 which can be considered as a special AN and has a wired connection to a core network, and the second UDN 120 comprises ANs 121A and 121B, an AGN 122. For a subscriber to the first UDN 110, e.g., a terminal device (TD) 113A, a wireless link A is established between the TD 113A and the AN 111. Likewise, a subscriber to the second UDN 120, e.g., a terminal device (TD) 123B, a wireless link B is established between the TD 123B and the AN 121A. While these two subscriber move into the overlapping area, interference occurs between the wireless links A and B if the links share the same radio resource. Such interference may adversely affect traffic performance, especially when a significant number of the TDs are moving into the overlapping area.

Typically, an interference coordination process for radio resource is triggered while an interference power for one wireless link exceeds a pre-determined coordination threshold. It should be noted that coordination performance is susceptible to the threshold. FIG. 2 illustrates coordination performance as a function of threshold where curves "seed 1" and "seed 2" represent bit rates for two downlinks, which are managed by different UDNs overlapped with each other and share the same radio resource. From FIG. 2, it is observed the bit rates vary with the different threshold values and have the respective maximums. The curves suggest the complexity and importance of threshold selection, and therefore, a sophisticated solution for determining threshold becomes necessary for dealing with this issue.

SUMMARY OF THE INVENTION

According to one aspect of the present invention there is provided a method for determining a threshold for inter-network interference coordination, on the basis of which it is determined whether radio resource shall be coordinated between a first wireless network and a second wireless network. The method comprises the steps of:

receiving interference levels for a plurality of wireless links associated with one or more wireless communication devices within the first wireless network, the interference levels being attributed to the second wireless network; and obtaining the threshold based on the interference levels.

In an embodiment according to the present invention, the interference levels are measured at the wireless communication devices. Preferably, the interference levels are represented as interference power or Signal to Interference plus Noise Ratio (SINR).

In an embodiment according to the present invention, the step of obtaining the threshold comprises:

from the wireless links, selecting a critical wireless link, which has the largest impact on overall utility of radio resource utilized by the wireless links; and determining the coordination threshold based on the interference level of the critical wireless link.

In an embodiment according to the present invention, the overall utility of radio resource is characterized with a plurality of utility parameters, each of which represents an overall utility level for a possible combination of radio resource usage patterns adopted by the wireless links, and the critical wireless link corresponds to the largest one among the plurality of utility parameters.

In an embodiment according to the present invention, the plurality of utility parameters are represented as:

$$U(1) = \sum_{n \neq n_1}^{N} u_n^1 + u_1^2$$

$$U(2) = \sum_{n \neq n_1, n \neq n_2}^{N} u_n^1 + u_1^2 + u_2^2$$

-continued $$U(i) = \sum_{n \neq n_1, n \neq n_2, \ldots, n \neq n_i} u_n^1 + u_1^2 + u_2^2 + \ldots + u_i^2$$

...

$$U(N) = \sum_{n=1}^{N} u_n^2$$

the wireless links are arranged in a descending order in terms of their interference levels, U(0), U(1), . . . , U(N) denote a group of possible combinations of radio resource usage patterns adopted by the wireless links, $u^1_n$ denotes a first utility function for the $n^{th}$ wireless link, $u^2_n$ denotes a second utility function for the $n^{th}$ wireless link, and the first and second utility functions represent utility metrics for the $n^{th}$ wireless link in two different radio resource usage patterns.

In an embodiment according to the present invention, if U(i) is the maximum in the group of U(1), U(2), . . . , U(N), the $i^{th}$ wireless link is selected as the critical wireless link, and the threshold T is determined as follows:

$$T = I_i - \Delta$$

$I_i$ denotes the interference level of the $i^{th}$ wireless link, and $\Delta$ is defined as one being less than the difference of the interference levels for every two neighbor wireless links in the descending order.

In an embodiment according to the present invention, the threshold is obtained based on coordination performance parameters associated with the interference levels in current and previous time windows with the following rule:

if the coordination performance parameter in the current time window is superior to the coordination performance parameter in the previous time window, then the threshold in the current time window is determined as follows:

$$T_i = T_{i-1} - \theta$$

Otherwise, the threshold $T_i$ is determined as follows:

$$T_i = T_{i-1} + \theta$$

$T_{i-1}$ denotes the threshold in the previous time window, $T_i$ denotes the threshold in the current time window, and $\theta$ denotes an adjusting step size.

In an embodiment according to the present invention, the coordination performance parameters are metrics on the communication quality of wireless connections within the coverage of the first network.

In an embodiment according to the present invention, the first and second wireless networks are ultra-dense networks, and the wireless communication devices are selected from a group consisting of an access node or a terminal device.

According to another aspect of the present invention there is provided a method for determining a threshold for inter-access node interference coordination, on the basis of which it is determined whether radio resource shall be coordinated between a first access node and a second access node. The method comprises the steps of:

from one or more terminal devices within the first access node, receiving interference levels for a plurality of wireless links associated with the one or more terminal devices, the interference levels being attributed to the second access node; and obtaining the threshold based on the interference levels.

According to another aspect of the present invention there is provided an apparatus for inter-network interference coordination. The apparatus comprises:

a communicating unit configured to receive interference levels for a plurality of wireless links associated with one or more wireless communication devices within a first wireless network, the interference levels being attributed to a second wireless network; and a coordination unit configured to obtain a threshold for inter-network interference coordination based on the interference levels, on the basis of which it is determined whether radio resource shall be coordinated between the first and second wireless networks.

In an embodiment according to the present invention, the first and second wireless networks are ultra-dense networks, and the apparatus is implemented in an access node within the first wireless network, a computation device within the first wireless network and a computation device independent of the first and second wireless networks.

According to another aspect of the present invention there is provided an apparatus for inter-access node interference coordination. The apparatus comprises:

a communicating unit configured to from one or more terminal devices within a first access node, receive interference levels for a plurality of wireless links associated with the one or more terminal devices, the interference levels being attributed to a second access node; and a coordination unit configured to obtain a threshold based on the interference levels, on the basis of which it is determined whether radio resource shall be coordinated between the first and second access nodes.

According to the above aspects of the present invention, the threshold is obtained based on the interference levels, which, in turn, are on the link-by-link basis. Therefore, the threshold obtained therefrom can be not only adaptive to interference-oriented coordination, but also to load-oriented coordination. Moreover, the present invention is applicable to either inter-network interference coordination or inter-access node interference coordination.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DETAILED DESCRIPTION

Figure 1:
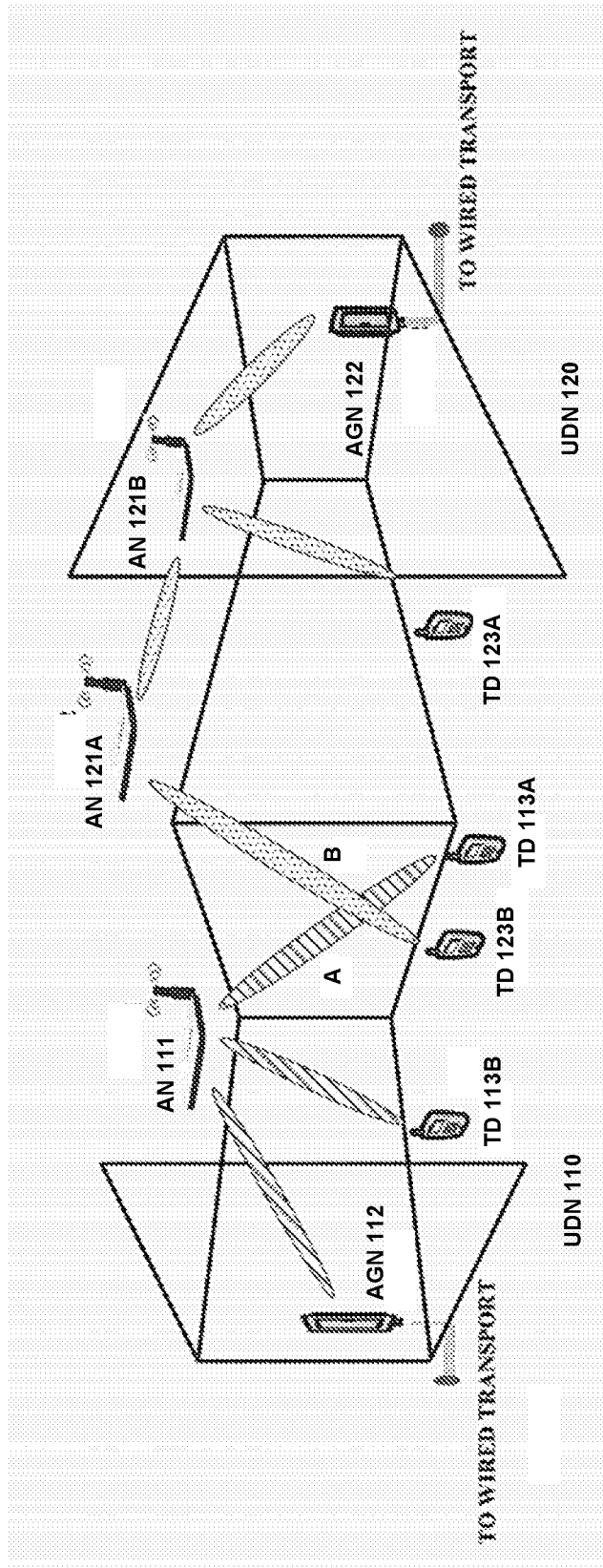
FIG. 1 schematically illustrates a scenario for inter-UDN interference.
Figure 2:
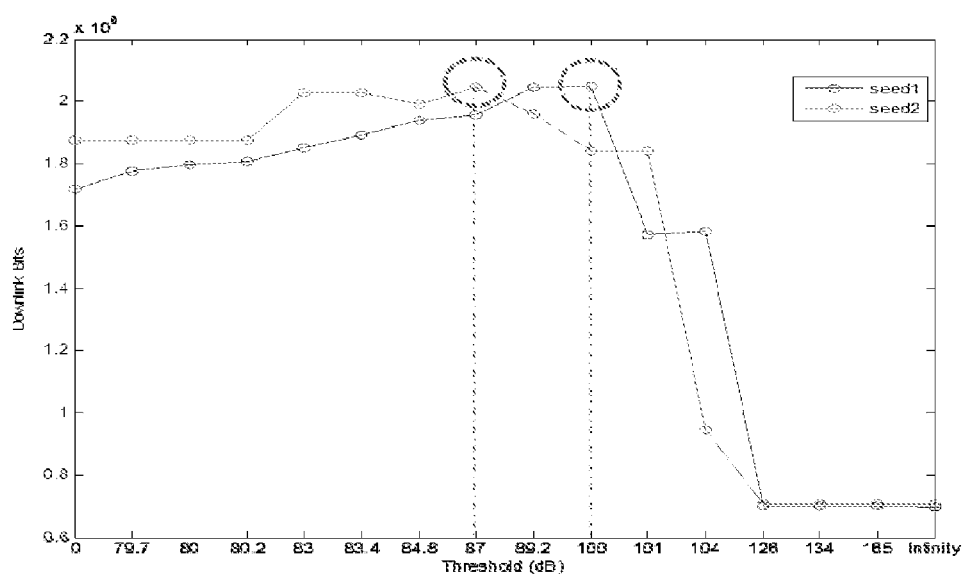
FIG. 2 illustrates coordination performance as a function of threshold.

The principles and operation of the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Generally, all terms used in the claims are to be interpreted according to their ordinary meaning in the technical field, unless explicitly defined otherwise herein. For example, the terminal device ("TD"), may be any suitable wireless communication terminal or user equipment ("UE"), such as a mobile phone or a portable computer. Likewise, the access node (AN) may be any suitable wireless communication intermediary devices, such as a wireless relay node, a wireless router, a wireless access point, a base station or a base site, which is capable of connecting the terminal device to another wireless access node or connecting the terminal device to the core network; the wireless link is a radio channel connecting wireless communication devices such as TDs and ANs, and may be anyone of an uplink, a downlink, a forward link and a reverse link.

The interference, as discussed throughout the present disclosure, is anything which alters, modifies, or disrupts a signal as it travels between a transmitter and a receiver due to channel reuse by other transmitter(s). Severe interference will cause an unacceptable deterioration in receiver performance and shall be eliminated or reduced. Typically, an interference level is measured at the receiver, such as TDs and the ANs. Preferably, the interference level is represented as interference power or Signal to Interference plus Noise Radio (SINR) for one wireless link. A pre-determined threshold is utilized to make a judgment whether the measure interference level is unacceptable for the wireless link, and an interference coordination process will be carried out in response to the occurrence of an unacceptable interference level.

All references to "a/an/the element, apparatus, component, means, step, etc." are to be interpreted as referring to at least one instance of the element, apparatus, component, means, step, etc., unless explicitly stated otherwise. The steps of any method disclosed herein do not have to be performed in the exact order disclosed, unless explicitly stated. The discussion above and below in respect of any of the aspects of the present disclosure is also in applicable parts relevant to any other aspect of the present disclosure.

Figure 3:
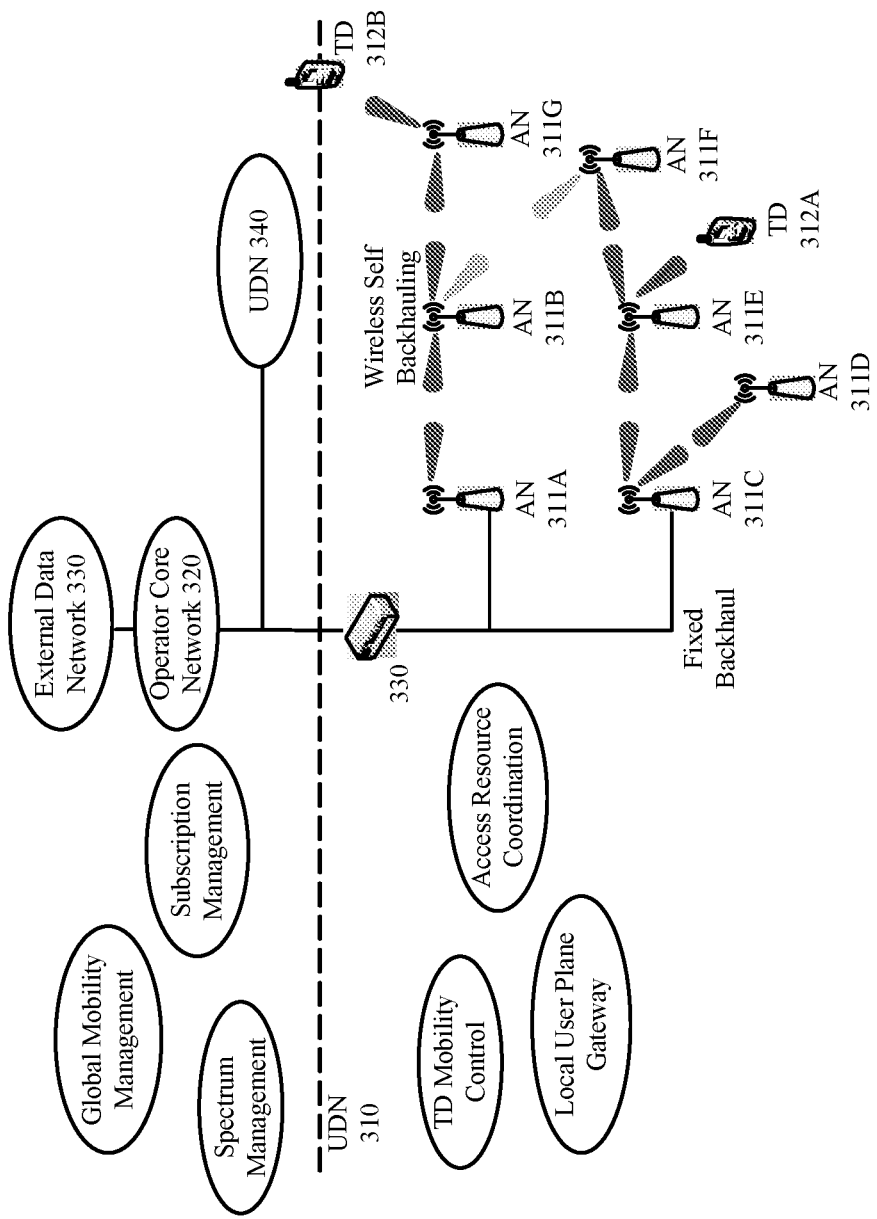
FIG. 3 is a schematic diagram depicting an Ultra-dense network (UDN) architecture.

FIG. 3 is a schematic diagram depicting an Ultra-dense network (UDN) architecture. Referring to FIG. 3, a first wireless network, e.g., UDN 310 herein, comprises ANs 311A-311G, which are configured to provide TDs 312A-312B within their respective coverage's with wireless access. For illustrative purpose, the TDs 312A and 312B are communicatively coupled to the ANs 311E and 311G, respectively. On the other hand, the ANs 311A-311G are communicatively coupled with each other. In particular, as shown in FIG. 3, the ANs 311A and 311C are connected together via a fixed backhaul link, and other ANs 311B, 311D-311G are connected to the AN 311A or 311C via wireless links. As a result, the ANs 311A-311G are either directly connected to fixed transport backhaul or wirelessly backhauled by other ANs. Moreover, these ANs are coupled to a transport aggregation node 313, over which they can communicate with an operator core network 320, an external data network 330, e.g., internet, or a second wireless network, e.g., UDN 340 herein, having overlapping coverage with the UDN 310.

With reference to FIG. 3, a plurality of logical functional entities, such as access resource coordination, TD mobility control, and local user plane gateway, are disposed at the UDN side. Note that these functional entities can be implemented in the ANs 311A-311G, local server(s) within the UDN 310 or device(s) independent of the UDN 310. On the other hand, functional entities, responsible for global mobility management, spectrum management and subscription management, are disposed at the operator core network side.

In the first wireless network, e.g., the UDN 310, a first wireless link, e.g., between the AN 311G and the TD 312B, is possibly interfered by one or more second wireless links managed by the second wireless network, e.g., the UDN 340 while these links share the same radio resource or spectrum band. This is referred to as "inter-network interference" hereinafter. On the other hand, "inter-AN interference" will occur in case a first wireless link, e.g., between the AN 311E and the TD 312A, shares the same radio resource with one or more second wireless links managed other ANs belonging to the UDN 310. When a first wireless link within the UDN 310 suffers from severe inter-UDN interference or inter-AN interference, radio resource coordination is carried out.

Figure 4:
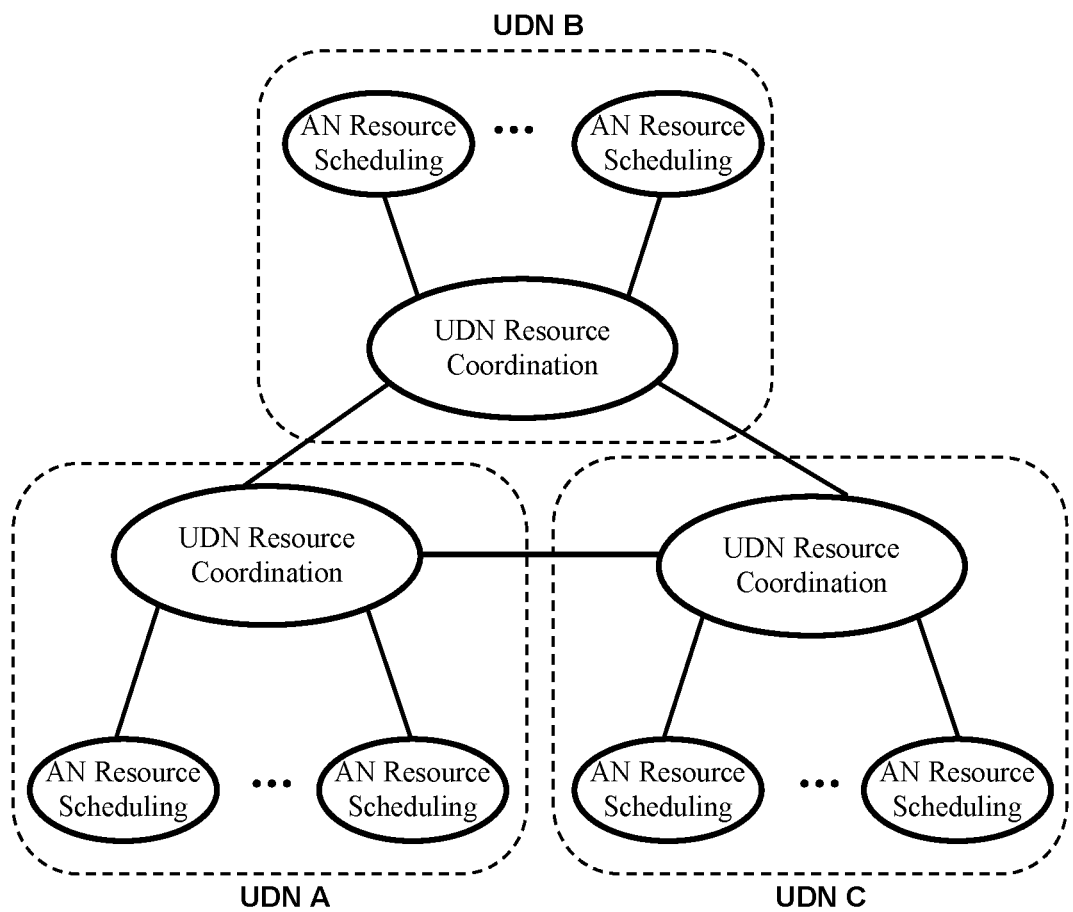
FIG. 4 is a schematic diagram illustrating a distributed structure for radio resource coordination.

FIG. 4 is a schematic diagram illustrating a distributed structure for radio resource coordination, where the coordination is carried out in the respective UDNs, e.g., UDNs A-C as shown therein. In each of the UDNs A-C, a functional entity for UDN resource coordination (URC) is provided to coordinate radio resource between ANs belonging to the same UDN for intra-UDN interference coordination. Meanwhile, the URC entities of the UDNs are communicatively coupled with each other so as to perform inter-UDN interference coordination. Moreover, in each of the UDNs A-C, a plurality of functional entities for AN resource scheduling (ARS) are provided, each of which is assigned to one of the ANs within the UDN and is configured to carry out radio resource allocation within the corresponding AN coverage in response to schemes, either for the inter-UDN interference coordination or the intra-UDN interference coordination, from the URC entity.

Figure 5:
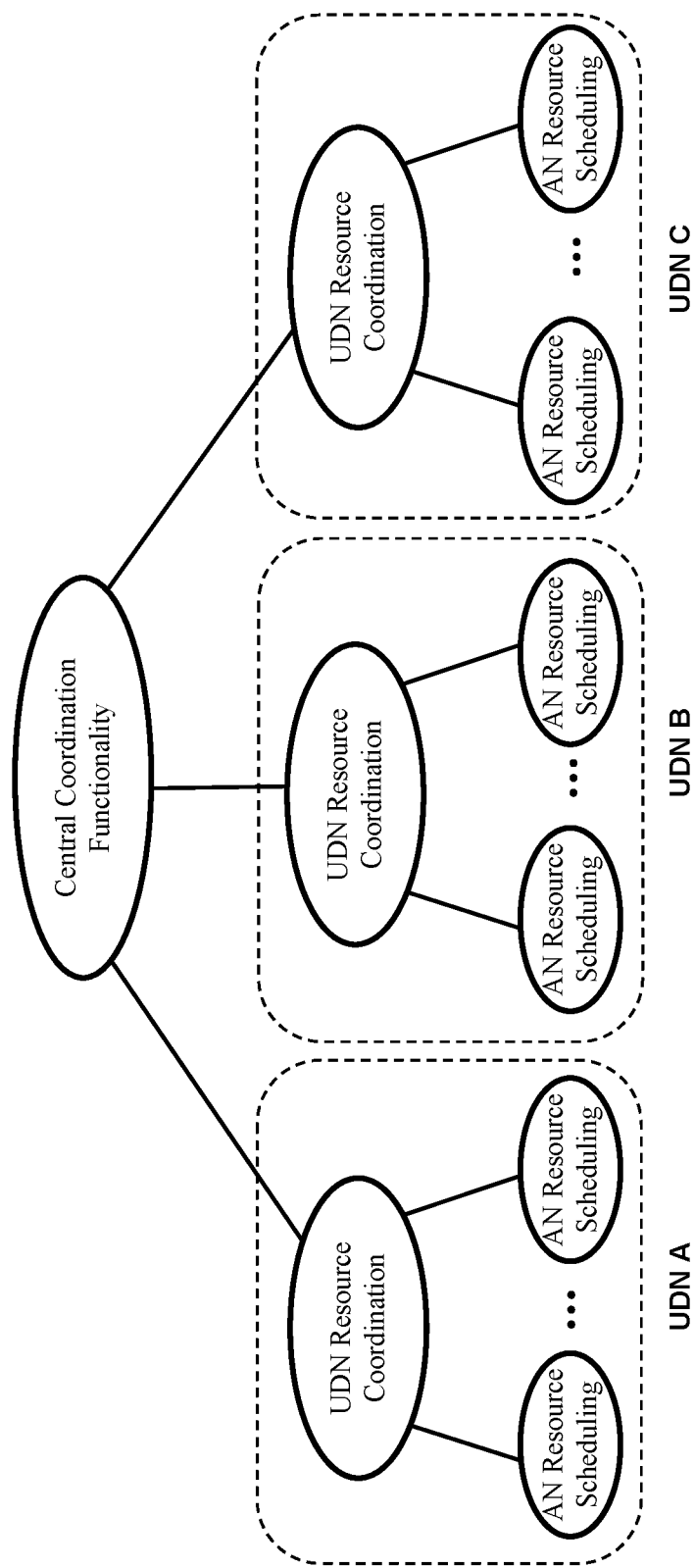
FIG. 5 is a schematic diagram illustrating a centralized structure for radio resource coordination.

FIG. 5 is a schematic diagram illustrating a centralized structure for radio resource coordination. As shown in FIG. 5, in each of the UDNs A-C, a functional entity for UDN resource coordination (URC) is also provided. However, in the centralized structure, the inter-UDN coordination is carried out in a functional entity, i.e., Central Coordination Functionality (CCF), to which the URC entities of the UDNs A-C are communicatively coupled. On the other hand, the URC entities are also responsible for intra-UDN interference coordination. With reference to FIG. 5, in each of the UDNs A-C, a plurality of functional entities for AN resource scheduling (ARS) are provided for carrying out radio resource allocation within their corresponding AN coverage based on either schemes for the inter-UDN interference coordination from the CCF entity, which is forwarded by the URC entities, or schemes for the intra-UDN interference coordination from the URC entity.

Note that the functional entities as indicated above shall be understood as logical elements and can be implemented at a variety of physical network nodes, including but not limited to an AN, a transport aggregation node, a local server within a UDN or a device independent of the UDN.

In the architecture as shown in FIG. 3, assuming a first wireless link, e.g., a downlink from the AN 311G to the TD 312B, is interfered by a second wireless link, e.g., a downlink within the second wireless network, e.g., the UDN 340. If the interference level for the first wireless link measured at the TD 312B exceeds a threshold $T_{inter\text{-}UDN}$, a coordination mechanism on radio resource usage is initiated at the first wireless network, e.g., the UDN 310 to reduce the interference level and vice versa. In the context of the distributed structure as shown in FIG. 4, the URC entity in the UDN 310 will negotiate with the counterpart in the UDN 340 over a coordination scheme, which defines the usage of the radio resource or spectrum band by the pair of the wireless links. Then, the subchannels are scheduled by the ARS entities for managing the pair of wireless links based on the coordination scheme. On the other hand, with the centralized structure as shown in FIG. 5, the URC entity in the UDN 310 will send a request for radio resource coordination to the CCF entity, which returns a coordination scheme to the URC entities in the UDN 310 and 340. The ARS entities will perform schedule on the subchannels for the pair of wireless links in response to the coordination scheme forwarded by the URC entities. Note that the coordination process as described above is also applicable to a pair of uplinks between the UDNs 310 and 340.

Figure 6:
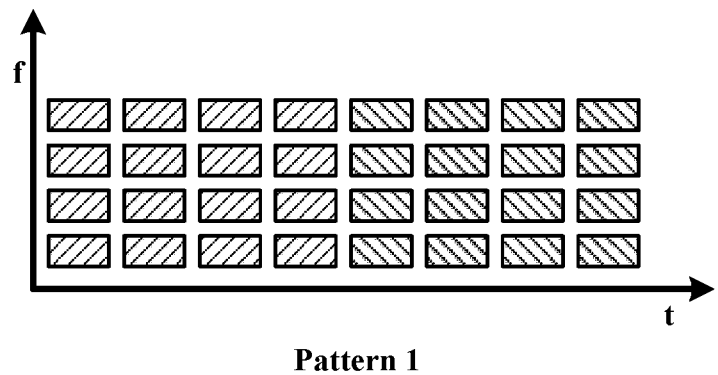
FIG. 6 is an illustrative diagram showing exemplary radio resource usage patterns where the longitudinal and horizontal coordinates represent frequency and time slot, respectively.
Figure 6:
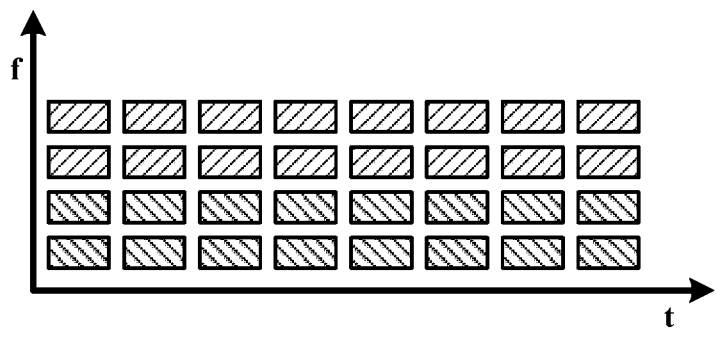
Figure 6:
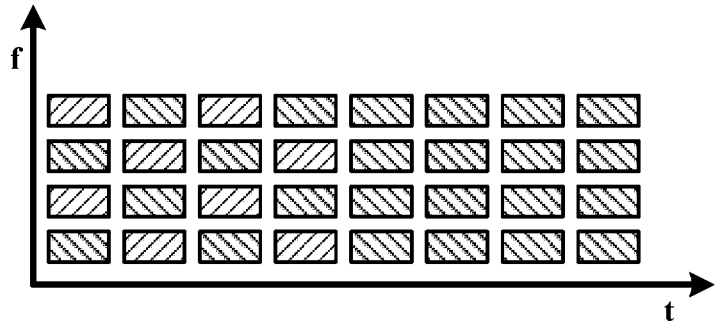

FIG. 6 is an illustrative diagram showing exemplary radio resource usage patterns where the longitudinal and horizontal coordinates represent frequency and time slot, respectively. In Pattern 1, four frequency subchannels (subcarriers or resource blocks) are occupied by the first and second wireless links alternately in time domain, and in Pattern 2, two of the frequency subchannels are assigned to the first wireless link, and the others are assigned to the second wireless link. Regarding Pattern 3, the frequency subchannels are occupied by the pair of the wireless links alternately in both of time domain and frequency domain. As a result, it prevents the pair of the wireless links from occupying the same radio resource simultaneously. Note that the frequency subchannels may be overlapped partially. In other words, they are at least partially orthogonal to each other.

Preferably, the coordination scheme is represented in form of a bit sequence (referred to as coordination context (CC) hereinafter), each bit of which corresponds to one of time slots in series and specifies whether a subchannel is permitted to be occupied by one of the pair of the links. For example, a bit sequence "11110000" for the UDN 310 indicates that one of the subchannels as shown in FIG. 4 is assigned to the first wireless link during the first four time slots and are unallowable during the second four time slots. Correspondingly, a bit sequence "00001111" is generated for the UDN 340, which indicates that the same subchannel is unallowable for the second wireless link during the first four time slots and is allowable during the second four time slots.

For the inter-AN coordination, a similar coordination mechanism will be carried out inside the same UDN. For example, assuming in a first access node, e.g., the AN 311E, a first uplink from the TD 312A to the AN 311E is interfered by a second uplink managed by a second access node, e.g., the AN 311F. When the interference level measured at the AN 311E exceeds a threshold $T_{inter\text{-}AN}$, the AN 311E will request the URC entity in the UDN 310 to formulate the coordination scheme as described above. As a result, the subchannels are scheduled by the ARS entities of the ANs 311E and 311F based on the coordination scheme.

Figure 7:
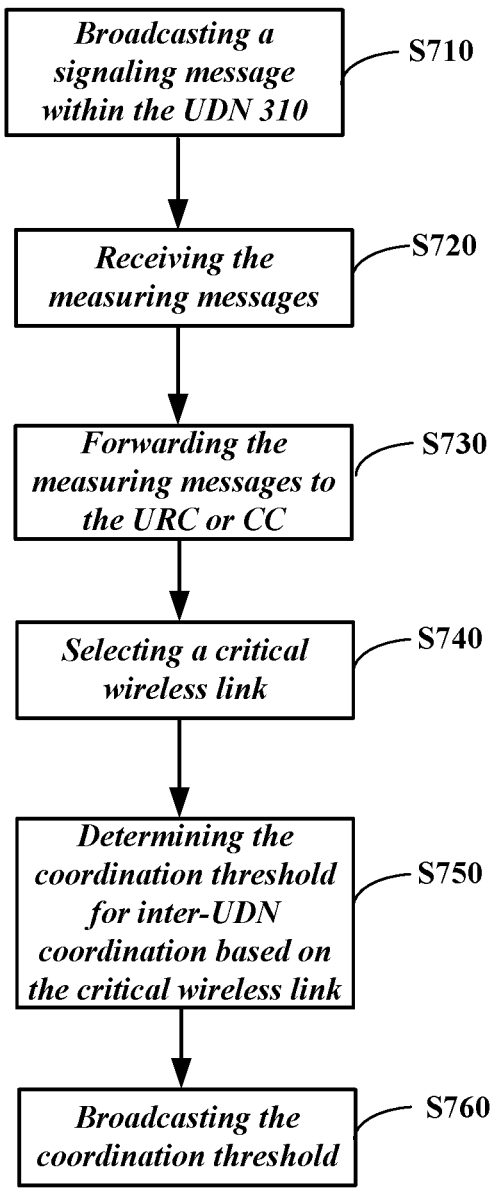
FIG. 7 is a process flow diagram of a method for determining a threshold for inter-network interference coordination according to one exemplary embodiment of the present invention.

FIG. 7 is a process flow diagram of a method for determining a coordination threshold for inter-network interference coordination according to one exemplary embodiment of the present invention. For illustrative purpose, the present embodiment is described in the context of the UDN architecture as discussed with reference to FIGS. 3-6. However, one skilled artisan in the art would recognize that the present invention is applicable to other wireless communication networks.

With reference to FIG. 7, at step S710, a signaling message for reporting local interference levels is broadcasted through one or more ANs within the UDN 310, e.g., the ANs 311A-311G. Note that the process may be triggered periodically or by the occurrence of a predefined event, e.g., the overall UDN performance deterioration, and thus the coordination threshold is updated dynamically.

In the present embodiment, the signaling message may involve with or be effective to all of or a subset of subscribed TDs to the UDN 310. Alternatively, the message may be further applied to non-subscribed TDs within the coverage of the UDN 310. In response to the message, each of the involved TDs, e.g., the TDs 312A and 312B, will perform measurement on one or more downlinks associated with it (referred to be as "the associated links" hereinafter). For each of the associated links, the associated TD, e.g., the TD 312B measures the signal power, i.e., the power for signal received from a transmitter, e.g., one of the ANs, e.g., the AN 311G, and the interference power, i.e., the power for interference, which is attributed to the other downlinks within the UDN 340. Alternatively, the signaling message may specify which link(s) among the associated links are necessary to be measured for the respective TDs.

Then, at step S720, the ANs within the UDN 310, e.g., the ANs 311A-311G, receive from the involved TDs a plurality of measuring messages, each of which is transmitted from one of the involved TDs, e.g., the TD 311B, and includes the measured signal power and interference power for the links associated with said one of the involved TDs. Optionally, it may further include the link ID(s) for identifying the interfering wireless link(s) and the UDN ID(s) for identifying which UDN(s) the interfering wireless link(s) belong to. Alternatively, only the associated links with significant interference levels are reported in the measuring messages. In particular, for any of the associated downlink, the TDs will filter out it if its interference power is not greater than a setting level, which may be selected as an initial coordination threshold or the coordination threshold determined previously.

At step S730, the ANs within the UDN 310 forward the received measuring messages to a functional entity for determining the coordination threshold, e.g., the URC entity for the UDN 310 in the case of the distributed structure as shown in FIG. 4, or the CC entity governing the coordination between the UDNs 310 and 340 in the case of the centralized structure as shown in FIG. 5. The process then proceeds to step S740, where the URC entity or the CC entity selects a critical wireless link from the associated links reported in the measuring messages from the involved TDs. The term "critical wireless link" herein refers to one having the largest impact on overall utility of radio resource utilized by a plurality of wireless links, e.g., the associated links reported by the involved TDs in the measuring messages. Regarding the term "overall utility of radio resource", it will be described with reference to FIG. 8.

At step S750, the URC entity or the CC entity determines the coordination threshold based on the interference power of the critical wireless link. For example, the threshold may be determined as one that is slightly less than the interference power of the critical wireless link.

Optionally, at step S760, the coordination threshold is broadcasted by the ANs within the UDN 310 in the case of the distributed structure or by the ANs within the UDNs 310 and 340 governed by the CC entity in the case of the centralized structure. As a result, an inter-UDN coordination mechanism will be initiated if the interference power for any of the wireless links within the UDN 310 or within the UDNs 310 and U340 exceeds the coordination threshold as determined at step S750.

As indicated above, the ARS entity as shown in FIGS. 4 and 5 is configured to carry out radio resource allocation within the corresponding AN coverage for the inter-UDN interference coordination. Therefore, the coordination threshold may be also determined in the ARS entity. In such a case, step S730 is skipped and steps S740 and S750 are carried out by the ARS entity instead of the URC entity and the CC entity.

In the above embodiment, the UDN side requests the reporting of the interference levels by broadcasting the signaling message. However, in other embodiments, the reporting may be actively initiated at the TD side within the UDN 310, either periodically or randomly.

Figure 8:
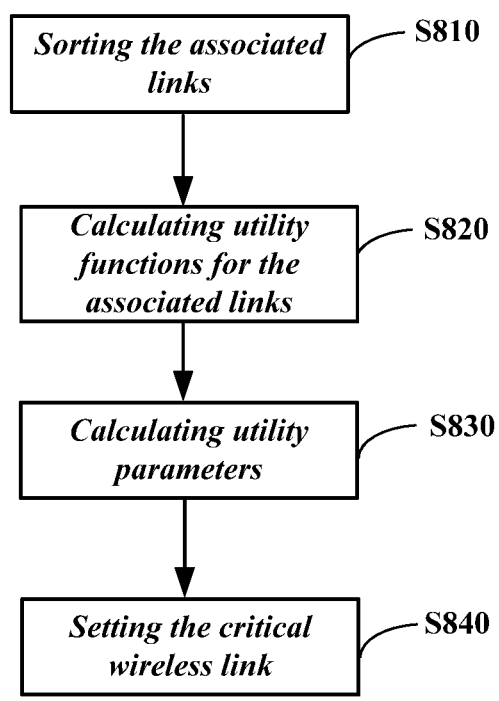
FIG. 8 is a flowchart illustrating method steps for selecting a critical wireless link, which is applicable to the exemplary embodiment as shown in FIG. 7.

FIG. 8 is a flowchart illustrating method steps for selecting a critical wireless link, which is applicable to the exemplary embodiment as shown in FIG. 7. For illustrative purpose, the method steps are carried out in the context of the embodiment as described with reference to FIG. 7.

Referring to FIG. 8, at step S810, all of the associated links reported in the measuring messages are arranged or sorted in a descending order based on their interference power. Assuming the associated links are expressed in a sorted sequence as follows:

$$\{L_1, L_2, \ldots, L_n, \ldots L_N\} \quad (1)$$

wherein $L_n$ denotes the $n^{th}$ associated link in the sorted sequence and N denotes the number of the associated links in the sorted sequence.

Correspondingly, the interference power for the associated links in the sorted sequence are expressed in the following descending sequence:

$$\{I_1, I_2, \ldots, I_n, \ldots I_N\} \text{ where } I_1 \geq I_2 \geq \ldots \geq I_n \geq \ldots \geq I_N \quad (2)$$

wherein $I_n$ denotes the $n^{th}$ interference power in the descending sequence, i.e., the interference power of the $n^{th}$ associated link in the sorted sequence, and N denotes the number of the associated links in the sorted sequence.

Then, at step S820, for each of the associated links in the sorted sequence, the URC entity or the CC entity calculates a plurality of utility functions, each of which represents the utility of a radio resource usage pattern, e.g., one of Patterns 1-3 as shown in FIG. 6.

In the present embodiment, for simplification, two usage patterns, e.g., denoted as a first usage pattern and a second usage pattern, are available. According to the first usage pattern, a pair of wireless links, e.g., consisting of one of the associated links in the UDNs 310 and its counterpart in the UDN 340, are allowed to be simultaneously scheduled at the whole available radio resources, e.g., four subchannels as shown in FIG. 6. Therefore the paired links will be interfered from each other. On the other hand, according to the second usage pattern, one of the paired links is only allowed to be scheduled at one half of the whole available radio resources, and the other is only allowed to be scheduled at the remaining resources. This suggests a compromise between resource occupancy and interference for the paired links.

Correspondingly, a first utility function and a second utility function are provided as metrics on the quality or condition of these usage patterns. As an example, the first and second utility functions may be defined as follows:

$$U_n^1 = \log_2\left(1 + \frac{P_n}{I_n + N_0}\right) \quad (3a)$$

wherein $U_n^1$ and $U_n^2$ denote the first and second utility function of the $n^{th}$ associated link in the sorted sequence respectively, $P_n$ denotes the signal power of the $n^{th}$ associated link in the sorted sequence, $I_n$ denotes the interference power of the $n^{th}$ associated link in the sorted sequence, and $N_0$ denotes the noise power.

Note that the utility functions as discussed above may be taken in other forms as long as the new versions can differentiate one usage pattern from other usage patterns. Preferably, the utility functions are taken in form of monotone functions.

The process then proceeds to step S830, where the URC entity or the CC entity calculates a plurality of utility parameters, each of which represents an overall utility level for a possible combination of the radio resource usage patterns for the associated links. In particular, the plurality of utility parameters are defined as follows:

$$U(1) = \sum_{n \neq 1}^{N} u_n^1 + u_1^2 \quad (4)$$

-continued $$U(2) = \sum_{n \neq 1, n \neq 2}^{N} u_n^1 + u_1^2 + u_2^2$$

...

$$U(i) = \sum_{n \neq 1, n \neq 2, \ldots, n \neq i}^{N} u_n^1 + u_1^2 + u_2^2 + \ldots + u_i^2$$

...

$$U(N) = \sum_{n=1}^{N} u_n^2$$

wherein $U(1), \ldots, U(N)$ denote the plurality of utility parameters, $u_n^1$ and $u_n^2$ denote the first and second utility function of the $n^{th}$ associated link in the sorted sequence respectively, N denotes the number of the associated links in the sorted sequence.

Assuming that $U(i)$ is the maximum in the plurality of utility parameters. Therefore, at step S840, the URC entity or the CC entity sets the $i^{th}$ associated link in the sorted sequence as the critical wireless link. In other words, the critical wireless link corresponds to the largest one among the plurality of utility parameters.

Referring to FIG. 7 again, for the critical wireless link determined according to the method steps as shown in FIG. 8, at step S750, the URC entity or the CC entity may determine the coordination threshold as follows:

$$T_{inter-UDN} = I_i - \Delta$$

for any $n$ $I_n - I_{n+1} \geq \Delta$ (5)

wherein $T_{inter-UDN}$ denotes the coordination threshold, $I_i$ denotes the interference power of the critical wireless link, $I_n$ and $I_{n+1}$ denote the interference power of the $n^{th}$ and $(n+1)^{th}$ associated links in the sorted sequence. As seen from Formula (5), $\Delta$ is defined as one being less than the difference of the interference levels for every two neighbor wireless links in the descending order.

Figure 9:
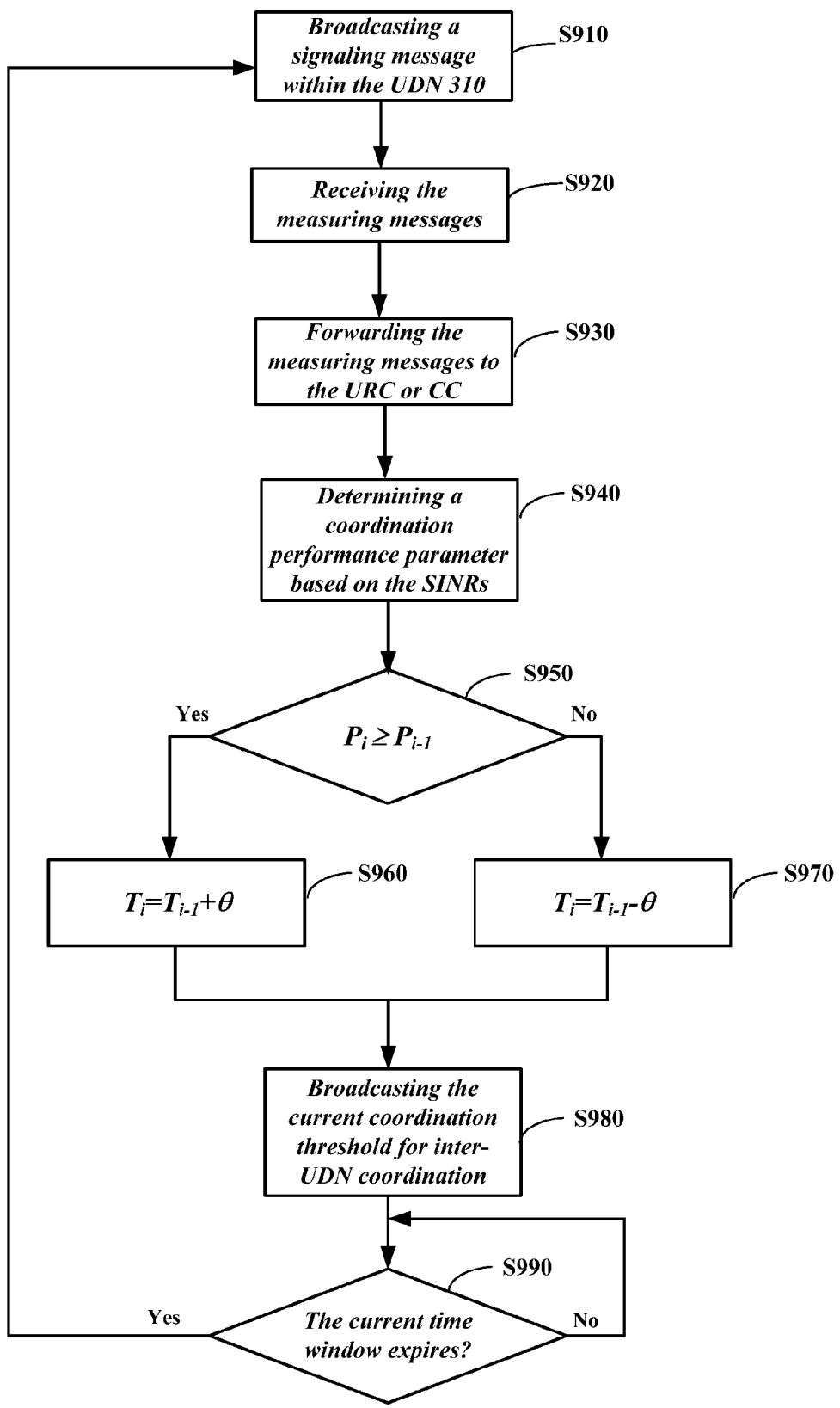
FIG. 9 is a process flow diagram of a method for determining a coordination threshold for inter-network interference coordination according to another exemplary embodiment of the present invention.

FIG. 9 is a process flow diagram of a method for determining a coordination threshold for inter-network interference coordination according to another exemplary embodiment of the present invention. For illustrative purpose, the present embodiment is also described in the context of the UDN architecture as discussed with reference to FIGS. 3-6. Moreover, in the present embodiment, the coordination threshold is dynamically determined or updated at a time interval and relies on its previous version. In other words, the coordination threshold is kept unchanged within one time window but is adjustable for the next time window.

With reference to FIG. 9, at step S910, under the control of the URC entity for the UDN 310 or the CC entity governing the coordination between the UDNs 310 and 340, the process for determining the threshold with the current time window (referring to as "the current process") is initiated by broadcasting a signaling message for reporting local interference levels from one or more ANs within the UDN 310, e.g., the ANs 311A-311G.

Similar to the embodiment as described previously, the signaling message may involve with or be effective to all of or a subset of subscribed TDs to the UDN 310, or non-subscribed TDs within the coverage of the UDN 310. Each of the involved TDs will respond to the signaling message by performing measurement on one or more wireless links, e.g., downlinks, associated with it and transmitting a measurement message to the ANs. For each of the associated links, measurement items include the signal power, i.e., the power for signal received from a transmitter, e.g., one of the ANs 311A-311G, and the interference power, i.e., the power for interference, which is attributed to the other wireless links within the UDN 340. In the present embodiment, each of the involved TDs, e.g., the TDs 312A and 312B, reports in the measurement message the SINR, which can be derived from the measurement items such as the signal power and the interference power.

Then, at step S920, the ANs within the UDN 310 receive from the involved TDs a plurality of measuring messages, each of which is transmitted from one of the TDs, e.g., the TD 312B, and includes the SINRs for the links associated with said one of the TDs. And at step S930, the ANs within the UDN 310 forward the received measuring messages to the URC entity or the CC entity for determining the coordination threshold.

The current process then proceeds to step S940, where the URC entity or the CC entity determines a coordination performance parameter based on the SINRs reported in the measuring messages. The term "coordination performance parameter" herein refers to metrics on the communication quality of wireless connections within an area, e.g., the coverage of the UDN 310. As indicated above, the coordination performance is susceptible to the coordination threshold, and thus the coordination performance parameter may be considered as criteria on whether it is necessary to adjust the current coordination threshold and/or how the current coordination threshold will be adjusted. As an example, the parameter is obtained by averaging the SINRs reported in the measuring messages. Alternatively, this parameter may be associated with network throughput, e.g., the sum or average of the date rates of wireless connections within an area, e.g., the coverage of the UDN 310.

At step S950, the URC entity or the CC entity compares the current coordination performance parameter $P_i$ obtained at step S940, with the previous coordination performance parameter $P_{i-1}$ obtained during the process for the previous time window. If $P_i \geq P_{i-1}$, the current process proceeds to step S960; otherwise, it proceeds to step S970. In the present embodiment, for the coordination performance parameter $P_0$, it may be predefined as an initial parameter.

At step S960, the URC entity or the CC entity determines the current coordination threshold $T_i$ as follows:

$$T_i = T_{i-1} - \theta \quad (6)$$

wherein $T_i$ denotes the current coordination threshold for the current time window, $T_{i-1}$ denotes the previous coordination threshold, i.e., one obtained during the process for the previous time window, and $\theta$ denotes a predetermined adjusting step size.

At step S970, the URC entity or the CC entity determines the current coordination threshold $T(i)$ as follows:

$$T_i = T_{i-1} + \theta \quad (7)$$

wherein $T_i$ denotes the current coordination threshold for the current time window, $T_{i-1}$ denotes the current coordination threshold obtained during the process for the previous time window, and $\theta$ denotes a predetermined adjusting step size.

With reference to FIG. 9, after step S960 or S970, the current process proceeds to step S980, where the ANs within the UDN 310 or the ANs within the UDNs 310 and 340 broadcast the current coordination threshold $T_i$ for inter-UDN coordination.

Then at step S990, the URC entity or the CC entity determines whether the current time window expires. If it expires, the current process returns step S910 so as to initiate the process for the next time window; otherwise, the current process will wait until the current time window expires.

It should be noted that the above embodiments described with reference to FIGS. 7-9 are also applicable to other scenarios where the ANs within the UDN 310 perform measurement on a plurality of uplinks associated with them. In particular, for each of the associated uplinks, the ANs measure the power for signal received from a transmitter, e.g., the TDs within the UDN 310, and the power for interference, which is attributed to the other uplinks within the UDN 340.

Figure 10:
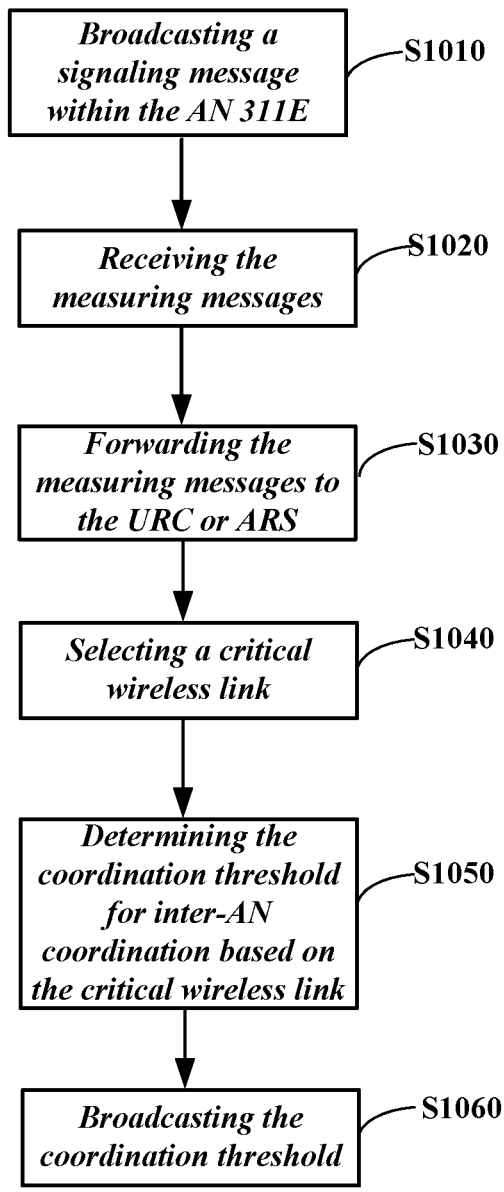
FIG. 10 is a process flow diagram of a method for determining a coordination threshold for inter-AN interference coordination according to one exemplary embodiment of the present invention.

FIG. 10 is a process flow diagram of a method for determining a coordination threshold for inter-AN interference coordination according to one exemplary embodiment of the present invention. For illustrative purpose, the present embodiment is also described in the context of the UDN architecture as discussed with reference to FIGS. 3-6.

With reference to FIG. 10, at step S1010, a signaling message for reporting local interference levels is broadcasted through one AN, e.g., the AN 311E.

Similarly, the process may be triggered periodically or by the occurrence of a predefined event, and the signaling message may involve with or be effective to all of or a subset of subscribed TDs within the AN 311E or non-subscribed TDs within the coverage of the AN 311E. In response to the measurement, each of the involved TDs will perform measurement on one or more wireless links associated with it. For each of the associated links, the associated TD, e.g., the TD 311A, measures the signal power, i.e., the power for signal received from a transmitter and the interference power, i.e., the power for interference, which is attributed to the wireless links of the other ANs within the UDN 310, e.g., the ANs 311D and 311F. Alternatively, the signaling message may specify which link(s) among the associated links are necessary to be measured for the respective TDs.

Then, at step S1020, the AN 311E receives from the involved TDs a plurality of measuring messages, each of which is transmitted from one of the TDs, e.g., the TD 311A, and includes the measured signal power and interference power for the links associated with said one of the TDs. Optionally, it may further include the link ID(s) for identifying the interfering wireless link(s) and the AN ID(s) for identifying which AN(s) the interfering wireless link(s) belong to. Alternatively, only the associated links with significant interference levels are reported in the measuring messages. In particular, for any of the associated link, the TDs will filter out it if its interference power is not greater than a setting level, which may be selected as an initial coordination threshold or the coordination threshold determined previously.

At step S1030, the AN 311E forwards the received measuring messages to a functional entity for determining the coordination threshold, e.g., the URC entity for the UDN 310 or the ARS entity for the AN 311E.

The process then proceeds to step S1040, where the URC entity or the ARS entity selects a critical wireless link from the associated links reported in the measuring messages. For example, the functional entity may select the critical wireless link by carrying out the method steps as shown in FIG. 8.

At step S1050, the URC entity or the ARS entity determines the coordination threshold based on the interference power of the critical wireless link in a manner similar to the embodiment as described with reference to FIGS. 7 and 8. And optionally, at step S1060, under the control of the URC entity or the ARS entity, the AN 311E broadcasts the current coordination threshold. As a result, an inter-AN coordination mechanism will be initiated if the interference power for any of the wireless links within the AN 311E exceeds the coordination threshold.

Figure 11:
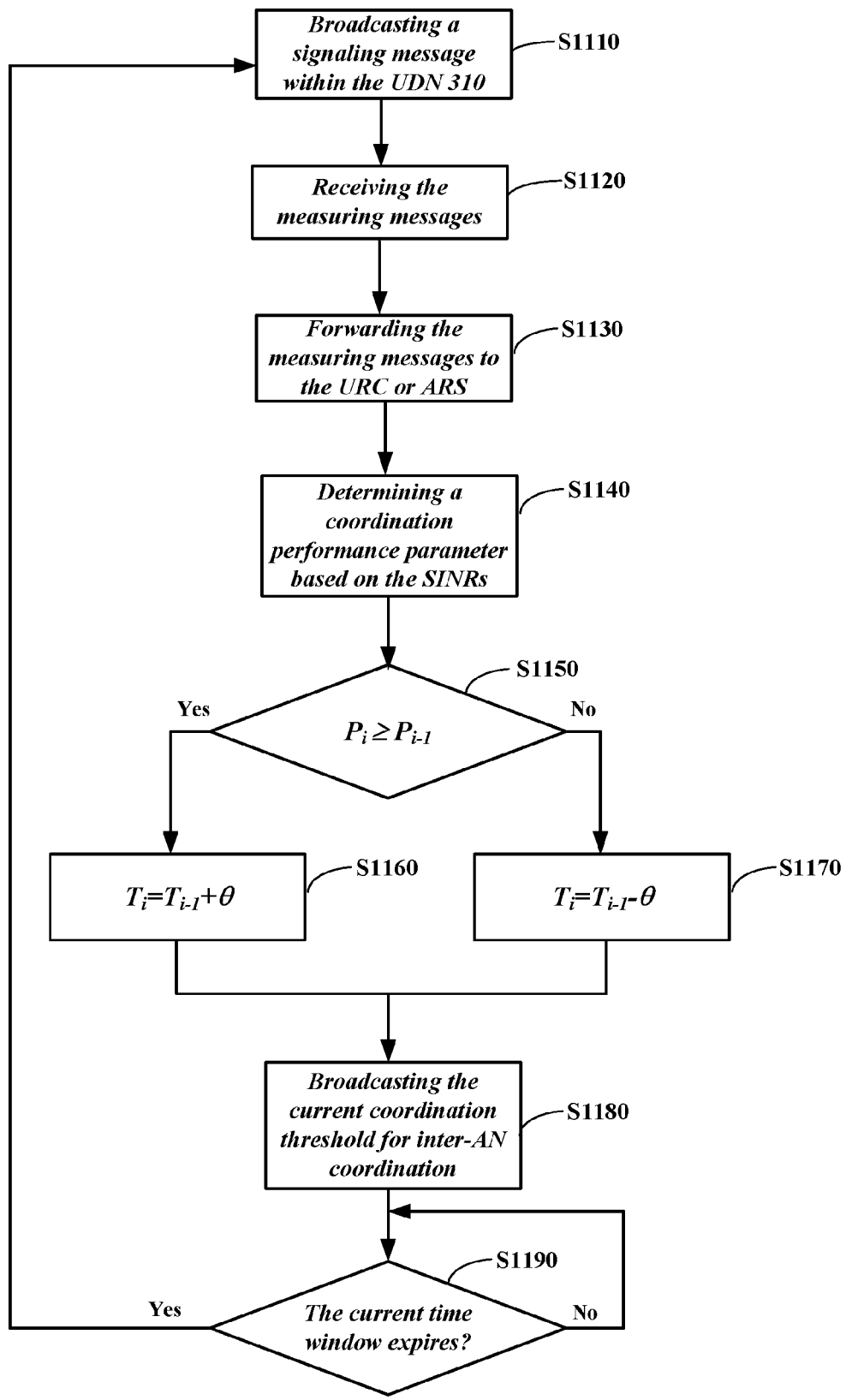
FIG. 11 is a process flow diagram of a method for determining a coordination threshold for inter-AN interference coordination according to another exemplary embodiment of the present invention.

FIG. 11 is a process flow diagram of a method for determining a coordination threshold for inter-AN interference coordination according to another exemplary embodiment of the present invention. For illustrative purpose, the present embodiment is also described in the context of the UDN architecture as discussed with reference to FIGS. 3-6. Similar to the embodiment as described with reference to FIG. 9, in the present embodiment, the coordination threshold is dynamically determined or updated at a time interval and relies on its previous version.

With reference to FIG. 11, at step S1110, the process for determining the threshold with the current time window (referring to as "the current process") is initiated by broadcasting a signaling message for reporting local interference levels from one AN, e.g., the AN 311E. Likewise, the signaling message may involve with or be effective to all of or a subset of subscribed TDs within the AN 311E, or non-subscribed TDs within the coverage of the AN 311E. Each of the involved TDs will respond to the signaling message by performing measurement on one or more wireless links associated with it and transmitting a measurement message to the AN 311E. For each of the associated links, measurement items include the signal power, i.e., the power for signal received from the AN 311E, and the interference power, i.e., the power for interference, which is attributed to the other wireless links of the other ANs within the same UDN, e.g., the ANs 311D and 311F. In the present embodiment, each of the involved TDs reports in the measurement message the signal to interference plus noise ratio (SINR).

Then, at step S1120, the AN 311E receive from the involved TDs a plurality of measuring messages, each of which is transmitted from one of the TDs and includes the SINRs for the links associated with one of the TDs. And at step S1130, the AN 311E forward the received measuring messages to the URC entity for the UDN 310 or the ARS entity for the AN 311E for determining the coordination threshold.

The current process then proceeds to step S1140, where the URC entity or the ARS entity determines a coordination performance parameter based on the SINRs reported in the measuring messages. The term "coordination performance parameter" herein refers to metrics on the communication quality of wireless connections within an area, e.g., the coverage of the AN 311E. As an example, the parameter is obtained by averaging the SINRs reported in the measuring messages. Alternatively, this parameter may be associated with network throughput, e.g., the sum or average of the date rates of wireless connections within an area, e.g., the coverage of the AN 311E.

At step S1150, the URC entity or the ARS entity compares the current coordination performance parameter $P_i$, which is obtained at step S1140, with the previous coordination performance parameter which was obtained during the process for the previous time window. If $P_i \geq P_{i-1}$ the current process proceeds to step S1160, where the URC entity or the ARS entity determines the current coordination threshold $T_i$ according formula (6); otherwise, it proceeds to step S1170, where the URC entity or the ARS entity determines the current coordination threshold $T_i$ according formula (7). Likewise, for the coordination performance parameter $P_0$, it may be predefined as an initial parameter.

With reference to FIG. 11, after step S1160 or S1170, the current process proceeds to step S1180, where under the control of the URC entity or the ARS entity, the AN 311E broadcasts the current coordination threshold $T_t$ for inter-AN coordination.

Then at step S1190, the URC entity or the ARS entity determines whether the current time window expires. If it expires, the current process returns step S1110 so as to initiate the process for the next time window; otherwise, the current process will wait until the current time window expires.

Figure 12:
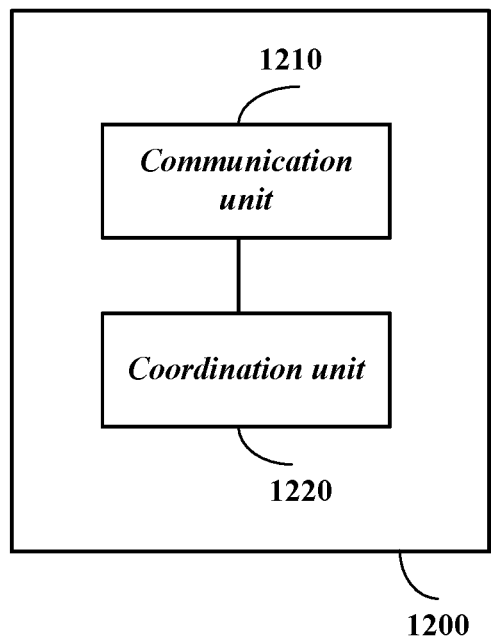
FIG. 12 is a block diagram illustrating an apparatus for inter-network interference coordination according to one exemplary embodiment of the present invention.

FIG. 12 is a block diagram illustrating an apparatus for inter-network interference coordination according to one exemplary embodiment of the present invention. For illustrative purpose, the present embodiment is described in the context of the UDN architecture as discussed with reference to FIGS. 3-6. However, one skilled artisan in the art would recognize that the present invention is applicable to other wireless communication networks.

With reference to FIG. 12, in the present embodiment, the apparatus 1200 comprises a communicating unit 1210 and a coordination unit 1220 coupled to each other.

The communicating unit 1210 is configured to receive interference levels for a plurality of wireless links, which are associated with wireless communication devices within the UDN 310, e.g., the ANs 311A-311G or the TDs 311A-311B. Similar to the embodiments described with reference to FIGS. 7-9, the interference levels are reported in measuring messages transmitted from the wireless communication devices. For example, each of the measuring messages includes the signal power and interference power attributed to other UDN(s), e.g., the UDN 340, for the wireless links associated with one of the wireless communication devices. Alternatively, each of the measuring messages may include the SINR for the wireless links associated with one of the wireless communication devices.

The coordination unit 1220 is configured to obtain a threshold for inter-network interference coordination based on the interference levels. Preferably, the threshold is obtained by carrying out the method steps as described with reference to FIGS. 7-9.

Figure 13:
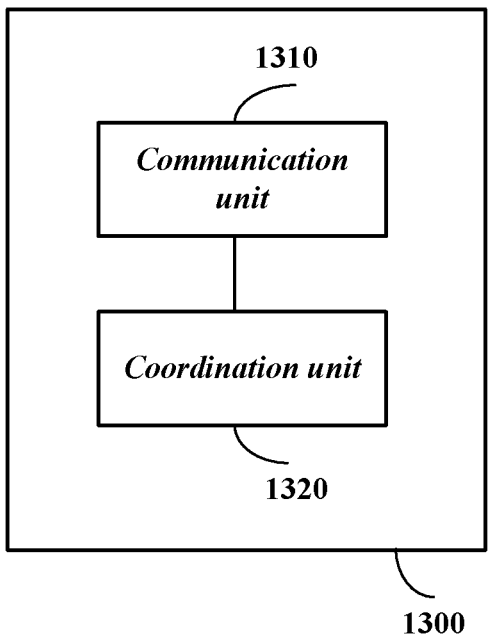
FIG. 13 is a block diagram illustrating an apparatus for inter-AN interference coordination according to one exemplary embodiment of the present invention.

FIG. 13 is a block diagram illustrating an apparatus for inter-AN interference coordination according to one exemplary embodiment of the present invention. For illustrative purpose, the present embodiment is described in the context of the UDN architecture as discussed with reference to FIGS. 3-6. However, one skilled artisan in the art would recognize that the present invention is applicable to other wireless communication networks.

With reference to FIG. 13, in the present embodiment, the apparatus 1300 comprises a communicating unit 1310 and a coordination unit 1320 coupled to each other.

The communicating unit 1310 is configured to receive interference levels for a plurality of wireless links, which are associated with one or more TDs within the coverage of an AN of the UDN 310. Likewise, the interference levels are reported in measuring messages transmitted from the TDs. As an example, each of the measuring messages includes the signal power and interference power attributed to other ANs within the same UDN, for the wireless links associated with one of the TDs. Alternatively, each of the measuring messages may include the SINR for the wireless links associated with one of the TDs.

The coordination unit 1320 is configured to obtain a threshold for inter-AN interference coordination based on the interference levels. Preferably, the threshold is obtained by carrying out the method steps as described with reference to FIGS. 10 and 11.

The apparatus described with reference to FIGS. 12 and 13 may be implemented in an access node with the UDN 310, a computation device within the UDN 310 or a computation device independent of the UDNs 310 and 340.

It should be noted that the aforesaid embodiments are illustrative of this invention instead of restricting this invention, substitute embodiments may be designed by those skilled in the art without departing from the scope of the claims enclosed. The wordings such as "include", "including", "comprise" and "comprising" do not exclude elements or steps which are present but not listed in the description and the claims. It also shall be noted that as used herein and in the appended claims, the singular forms "a", "an", and "the" include plural referents unless the context clearly dictates otherwise. This invention can be achieved by means of hardware including several different elements or by means of a suitably programmed computer. In the unit claims that list several means, several ones among these means can be specifically embodied in the same hardware item. The use of such words as first, second, third does not represent any order, which can be simply explained as names.

What is claimed is:

1. A method for determining a threshold for inter-network interference coordination, on the basis of which it is determined whether radio resource shall be coordinated between a first wireless network and a second wireless network, the method comprising the steps of:

receiving interference levels for a plurality of wireless links associated with one or more wireless communication devices within the first wireless network, said interference levels being attributed to the second wireless network; and obtaining the threshold based on the interference levels, wherein the step of obtaining the threshold comprises:

from the plurality of wireless links, selecting a critical wireless link, which has the largest impact on overall utility of radio resource utilized by the plurality of wireless links, wherein the overall utility of radio resource is characterized with a plurality of utility parameters, each of which represents an overall utility level for a possible combination of radio resource usage patterns adopted by the plurality of wireless links, and wherein the critical wireless link corresponds to the largest one among the plurality of utility parameters.

2. The method according to claim 1, wherein the interference levels are represented as interference power or Signal to Interference plus Noise Ratio (SINR) measured at the one or more wireless communication devices.

3. The method according to claim 1, wherein the step of obtaining the threshold further comprises:

determining the threshold based on the interference level of the selected critical wireless link.

4. The method according to claim 1, wherein the plurality of utility parameters are represented as:

$$U(1) = \sum_{n \neq n_1}^{N} u_n^1 + u_1^2$$

-continued $$U(2) = \sum_{n \neq n_1, n \neq n_2}^{N} u_n^1 + u_1^2 + u_2^2$$

...

$$U(i) = \sum_{n \neq n_1, n \neq n_2, \ldots, n \neq n_i}^{N} u_n^1 + u_1^2 + u_2^2 + \ldots + u_i^2$$

...

$$U(N) = \sum_{n=1}^{N} u_n^2$$

wherein the plurality of wireless links are arranged in a descending order in terms of their interference levels, U(0), U(1), . . . , U(N) denote a group of possible combinations of radio resource usage patterns adopted by the plurality of wireless links, $u_n^1$ denotes a first utility function for the $n^{th}$ wireless link, $u_n^2$ denotes a second utility function for the $n^{th}$ wireless link, and wherein the first and second utility functions represent utility metrics for the $n^{th}$ wireless link in two different radio resource usage patterns.

5. The method according to claim 4, wherein if U(i) is the maximum in the group of U(1), U (2), . . . , U(N), the $i^{th}$ wireless link is selected as the critical wireless link, and the threshold T is determined as follows:

$T = I_i - \Delta$, and wherein $I_i$ denotes the interference level of the $i^{th}$ wireless link, and $\Delta$ is defined as one being less than a difference of the interference levels for every two neighbor wireless links in the descending order.

6. The method according to claim 1, wherein the threshold is obtained based on coordination performance parameters associated with the interference levels in current and previous time windows with the following rule:

if the coordination performance parameter in the current time window is superior to the coordination performance parameter in the previous time window, then the threshold in the current time window is determined as follows:

$T_i = T_{i-1} - \theta$,

Otherwise, the threshold $T_i$, is determined as follows:

$T_i = T_{i-1} + \theta$, and wherein $T_{i-1}$ denotes the threshold in the previous time window, $T_i$, denotes the threshold in the current time window, and $\theta$ denotes an adjusting step size.

7. The method according to claim 6, wherein the coordination performance parameters are metrics on communication quality of wireless connections within a coverage of the first wireless network.

8. The method according to claim 1, wherein the first and second wireless networks are ultra-dense networks, and the one or more wireless communication devices are selected from a group consisting of an access node or a terminal device.

9. A method for determining a threshold for inter-access node interference coordination, on the basis of which it is determined whether radio resource shall be coordinated between a first access node and a second access node, the method comprising the steps of:

from one or more terminal devices within the first access node, receiving interference levels for a plurality of wireless links associated with said one or more terminal devices, said interference levels being attributed to the second access node; and obtaining the threshold based on the interference levels, wherein the step of obtaining the threshold comprises:

from the plurality of wireless links, selecting a critical wireless link, which has the largest impact on overall utility of radio resource utilized by the plurality of wireless links, wherein the overall utility of radio resource is characterized with a plurality of utility parameters, each of which represents an overall utility level for a possible combination of radio resource usage patterns adopted by the plurality of wireless links, and wherein the critical wireless link corresponds to the largest one among the plurality of utility parameters.

10. An apparatus for inter-network interference coordination, the apparatus comprising:

a communicating unit configured to receive interference levels for a plurality of wireless links associated with one or more wireless communication devices within a first wireless network, said interference levels being attributed to a second wireless network; and a coordination unit configured to obtain a threshold for the inter-network interference coordination based on the interference levels, on the basis of which it is determined whether radio resource shall be coordinated between the first and second wireless networks, wherein to obtain the threshold, the coordination unit is configured to:

from the plurality of wireless links, select a critical wireless link, which has the largest impact on overall utility of radio resource utilized by the plurality of wireless links, wherein the overall utility of radio resource is characterized with a plurality of utility parameters, each of which represents an overall utility level for a possible combination of radio resource usage patterns adopted by the plurality of wireless links, and wherein the critical wireless link corresponds to the largest one among the plurality of utility parameters.

11. The apparatus according to claim 10, wherein the interference levels are represented as interference power or Signal to Interference plus Noise Ratio (SINR) measured at the one or more wireless communication devices.

12. The apparatus according to claim 10, wherein the coordination unit is further configured to:

determine the threshold based on the interference level of the selected critical wireless link.

13. The apparatus according to claim 10, wherein the plurality of utility parameters are represented as:

$$U(1) = \sum_{n \neq n_1}^{N} u_n^1 + u_1^2$$

$$U(2) = \sum_{n \neq n_1, n \neq n_2}^{N} u_n^1 + u_1^2 + u_2^2$$

...

$$U(i) = \sum_{n \neq n_1, n \neq n_2, \ldots, n \neq n_i}^{N} u_n^1 + u_1^2 + u_2^2 + \ldots + u_i^2$$

...

$$U(N) = \sum_{n=1}^{N} u_n^2$$

wherein the plurality of wireless links are arranged in a descending order in terms of their interference levels, $U(0), U(1), \ldots, U(N)$ denote a group of possible combinations of radio resource usage patterns adopted by the plurality of wireless links, $u_n^1$ denotes a first utility function for the $n^{th}$ wireless link, $u_n^2$ denotes a second utility function for the $n^{th}$ wireless link, and wherein the first and second utility functions represent utility metrics for the $n^{th}$ wireless link in two different radio resource usage patterns.

14. The apparatus according to claim 13, wherein if $U(i)$ is the maximum in the group of $U(1), U(2), \ldots, U(N)$, the $i^{th}$ wireless link is selected as the critical wireless link, and the threshold T is determined as follows:

$$T=I_i-\Delta, \text{ and}$$

wherein $I_i$ denotes the interference level of the $i^{th}$ wireless link, and $\Delta$ is defined as one being less than a difference of the interference levels for every two neighbor wireless links in the descending order.

15. The apparatus according to claim 10, wherein the coordination unit is configured to obtain the threshold based on coordination performance parameters associated with the interference levels in current and previous time windows with the following rule:

if the coordination performance parameter in the current time window is superior to the coordination performance parameter in the previous time window, then the threshold in the current time window is determined as follows:

$$T_i=T_{i-1}-\theta,$$

Otherwise, the threshold $T_i$, is determined as follows:

$$T_i=T_{i-1}+\theta$$

wherein $T_{i-1}$ denotes the threshold in the previous time window, $T_i$ denotes the threshold in the current time window, and $\theta$ denotes an adjusting step size.

16. The apparatus according to claim 15, wherein the coordination performance parameters are metrics on communication quality of wireless connections within a coverage of the first wireless network.

17. The apparatus according to claim 10, wherein the first and second wireless networks are ultra-dense networks, and the apparatus is implemented in an access node within the first wireless network, a computation device within the first wireless network, and a computation device independent of the first and second wireless networks.

18. An apparatus for inter-access node interference coordination, the apparatus comprising;

a communicating unit configured to from one or more terminal devices within a first access node, receive interference levels for a plurality of wireless links associated with said one or more terminal devices, the interference levels being attributed to a second access node; and a coordination unit configured to obtain a threshold based on the interference levels, on the basis of which it is determined whether radio resource shall be coordinated between the first and second access nodes, wherein to obtain the threshold, the coordination unit is configured to:

from the plurality of wireless links, select a critical wireless link, which has the largest impact on overall utility of radio resource utilized by the plurality of wireless links, wherein the overall utility of radio resource is characterized with a plurality of utility parameters, each of which represents an overall utility level for a possible combination of radio resource usage patterns adopted by the plurality of wireless links, and wherein the critical wireless link corresponds to the largest one among the plurality of utility parameters.

* * * * *